United States Patent Office 3,493,520
Patented Feb. 3, 1970

3,493,520
ASHLESS LUBRICATING OIL DETERGENTS
Joseph A. Verdol, Dolton, Ill., and Donald J. Carrow, Louisville, Ky., assignors to Sinclair Research, Inc., New York, N.Y., a corporation of Delaware
No Drawing. Continuation-in-part of application Ser. No. 487,624, Sept. 15, 1965. This application June 4, 1968, Ser. No. 734,209
Int. Cl. C10m 1/28
U.S. Cl. 252—51.5                 12 Claims

ABSTRACT OF THE DISCLOSURE

Ashless lubricating oil detergents are provided by the reaction product of
(A) a carboxylic acid or acid anhydride containing addition copolymer having at least two carboxylic acid or acid anhydride groups,
(B) an amine,
(C) an alkylated phenol, and
(D) an aldehyde.

---

This application is a continuation-in-part of application Ser. No. 487,624, filed Sept. 15, 1965, and now abandoned.

The present invention is directed to novel materials, useful, for instance, as additives for lubricating oils. More specifically the invention concerns the reaction products of a carboxylic acid copolymer, an alkylated phenol, an aldehyde and an amine which materials find use as lubricting oil detergents and anti-oxidants.

The use of metallic detergents in internal combustion engine lubricating oil compositions is well known, particular utility for these detergents being found in lubricating oil compositions which are subjected to heavy duty service resulting in the oxidation of the oil with the resultant formation of sludge and varnish. Although these detergents such as metallic petroleum sulfonates have been very useful in maintaining sludge and varnish suspended in the oil they have the disadvantage of being themselves subject to breakdown and deterioration resulting in the formation of a metallic ash which accumulates in the combustion chamber of the internal engine.

Another drawback of many metallic detergents is that they lack sufficient basicity to effectively counteract the deleterious acidic materials commonly found in lubricating oils. Nor have these metallic detergents proven effective in dispersing the "blow-by" contamination of the lubricating oil when the engine is operated in light service and at low operating temperatures. When the engine is cold the cylinder walls act as a condenser for the fuel vapors and combustion products in the cylinder. These contaminants wash past or "blow-by" the piston rings into the crankcase wherein they tend to emulsify and coagulate causing insoluble sludge deposits which the usual metallic detergents are unable to redisperse. To overcome these blow-by contaminants and to disperse the sludge deposits in the crankcase, attempts have been made to provide ashless dispersants which will prove effective at the low operating temperatures found in light service internal combustion engines.

It has now been found that the base oil-soluble reaction product of a copolymer carboxylic acid, an alkylated phenol, an aldehyde and an amine, when added to a base oil of lubricting viscosity in small amounts, provides the oil with excellent dispersant and antioxidant properties. The reaction product can also be used as an alkaline metal salt.

The sequence in which the reactants can be combined to afford the oil-soluble additives of the present invention can be varied. Regardless of the sequence of reaction and reaction conditions, however, about 0.1 to 2 moles, preferably about 0.2 to 1 mole, of total amine per average reactive carboxylic acid group (including anhydride groups as one such carboxyl group) is generally reacted per mole of reactive acid group, and at least about 0.2 mole, preferably up to about 2 moles, of each of the alkylated phenol and aldehyde per average basic nitrogen atom present in a mole of amine reactant, is reacted. Advantageously, each of the substituted phenol and the aldehyde is present in an amount of about 0.2 to 1 mole per average basic nitrogen atom in the amine.

The four major reactants which can be employed to form the reaction products of the reaction will be described under separate headings.

The copolymer carboxylic acid reactant

The copolymer carboxylic acids of the present invention can be the various materials having a copolymeric backbone, preferably hydrocarbon and having at least two carboxylic acid or acid anhydride groups. These polymeric materials include the copolymers of ethylenically unsaturated carboxylic acids or anhydrides of 3 to 15 carbon atoms; and noncarboxylic addition polymerizable vinyl compounds of 2 to 12 carbon atoms such as for example, alphaolefins such as ethylene, propylene, butylene, pentylene, hexylene, heptylene, octylene, nonylene, decylene, dodecylene, alkyl vinyl ethers such as methyl vinyl ether, ethyl vinyl ether, butyl vinyl ether, styrene or other polymerizable vinyl compounds; as well as copolymers of more than one of either the vinyl compounds or the unsaturated acids or both. Preferred examples of these materials are styrene-maleic anhydride copolymers, alkylvinyl ether-maleic anhydride copolymers, ethylene-maleic anhydride copolymers, alpha-olefin-maleic anhydride copolymers, etc. Other preferred polymeric carboxylic acid anhydride products such as polymers derived from the polymerization of styrene and acrylic acid; butadiene and acrylic acid; butadiene and methacrylic acid; styrene, alpha-olefin and maleic anhydride; styrene, alpha-olefin and acrylic acid, etc., can be employed to prepare additives of the present invention. The average molecular weights of the copolymeric carboxylic acid may often vary from about 200 to 40,000, preferably about 400 to 10,000.

Particularly preferred acid reactants are the copolymer resins of the above-described vinyl compounds and maleic anhydride, for instance styrene-maleic anhydride resins. Usually a mole ratio of vinyl compound to maleic anhydride is of about 1 to 4:1, preferably 1 to 3:1 is employed to prepare the copolymer. These copolymer resins may contain repeating vinyl compound-maleic anhydride units and preferably have an average molecular weight of about 400 up to about 40,000 or more, preferably about 400 to 3,000. The melting points of the lower molecular weight copolymers will generally range from about 80 to 300° C. as determined by the Fisher-Johns Melting Point Apparatus. The determination of average molecular weight as used herein is made by the Thermoelectric Differential Vapor Pressure Lowering Method on a Microlab Osmometer.

A minor molar amount of the total carboxylic acid reactant may be composed of monomeric carboxylic acid, and when the latter component is present it is often at least about 5 molar percent of the total carboxylic acid reactant. Such acids are the mono- and polycarboxylic monomeric acids including the corresponding acid anhydrides, esters or acid halides of the carboxylic acids. The acid can be straight chain or branched, saturated or unsaturated, aliphatic (including cycloaliphatic), aromatic or heterocyclic. The monomeric carboxylic acids include, for instance, the monocarboxylic and polycarboxylic acids and their anhydrides, containing at least 2, often to about 26 or more, carbon atoms. Preferred carboxylic acids include the aliphatic mono- and dicarboxylic or alkanoic acids and anhydrides of 2 to about 21 carbon atoms. Illustrative of suitable carboxylic acids and anhydrides are the fatty acids, preferably of about 8 to 21 carbon atoms such as lauric acid, stearic acid, palmitic acid, oleic acid and the like. Examples of suitable polycarboxylic acids are succinic acid, alkyl or alkenyl succinic acids wherein the alkyl or alkenyl group contains say from 1 to about 200 carbon atoms or more, trimellitic acid, pyromellitic acid, naphthalene, 2,6-dicarboxylic acid, naphthoic anhydrides, phthalic anhydride, isophthalic acid, maleic anhydride, itaconic acid, etc.

Amine reactant

The amine component of the reaction production of the invention can be either a monoamine or a polyamine or both, for instance, each in an amount of at least about 0.05 mole per mole of reactive carboxylic acid group of the copolymer reactant.

The monoamine reactant of the invention includes those having the formula:

wherein R is a monovalent hydrocarbon radical, preferably alkyl, including cycloalkyl, of up to about 100 or more carbon atoms, preferably about 5 to 25 carbon atoms, and R' is R or hydrogen. Advantageously, at least one R has at least 5 carbon atoms, for instance, about 12 to 20 carbon atoms, R can be straight or branched chained, saturated or unsaturated, aliphatic or aromatic, and is preferably saturated. The preferred monoamines are the primary monoamines. Examples of suitable monoamines are amyl amine, 2-ethylhexyl amine, n-octyl amine, decyl amine, octadecy amine, lauryl amine, stearyl amine, N-methylstearyl amine, N-ethyl octadecyl amine, 2-phenyl decyl amine, and the like or mixtures thereof. The monoamine can also be substituted with groups which do not interfere with the reaction of the amino group of the amine with the acid moiety of the carboxylic acid component and do not otherwise unduly deleteriously affect the desired properties of the final reaction product. Illustrative of non-interfering groups are carboxyl, nitro, halogen, etc.

Suitable polyamines of the invention include those represented by the formula:

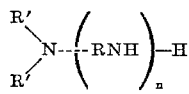

wherein $n$ is a number of at least 1, commonly 2 to about 10; R is an alkylene radical of 2 to about 25 carbon atoms, preferably 2 to 19 carbon atoms, and R' is selected from H and a hydrocarbon radical, such as alkyl, including cycloalkyl, of 1 to about 30 carbon atoms, preferably of 1 to about 7 carbon atoms. Both R and R' can be substituted with non-deleterious groups.

These polyamines include monoalkylene diamines, dialkylaminoalkylamines and the polyalkylenepolyamines. Illustrative of suitable monoalkylene diamines are ethylene diamine, propylene diamine, butylene diamine, octylene diamine, etc. Examples of suitable dialkylaminoalkylamines are dimethylaminomethylamine, dimethylaminoethylamine, dimethylaminopropylamine, dimethylaminobutylamine, diethylaminopropylamine, methylpropylaminoamylamine, propylbutylaminoethylamine, etc. Non-limiting examples of the polyalkylenepolyamine reactants are diethylenetriamine; triethylenetetramine; tetraethylenepentamine; etc.

Aldehyde reactant

The aldehyde component may be, for instance, an aliphatic or aromatic aldehyde and the aldehyde has the formula:

where R is selected from hydrogen and a monovalent hydrocarbon radical often of 1 to 10 carbon atoms, preferably a non-olefinic, non-acetylenic hydrocarbon radical, that is, having adjacent carbon-to-carbon distances no closer than 1.4 angstroms. The preferred aldehyde is formaldehyde because of its reactivity and low cost.

The alkylated phenol

The alkylated phenols contemplated herein are the reactive phenols, preferably monohydric, and are alkylated, i.e., having at least one alkyl group preferably of sufficient length to impart oil-solubility to the condensation products. Such phenols are reactive, that is characterized by having at least one ortho or para position which is available as a reaction site in the nucleus. Representative alkyl phenols which can be employed are those in which the alkyl group contains from about 4 to 20 carbon atoms, and preferably those having about 8 to 20 carbon atoms, such as, for example, n-amyl phenol, diamyl phenol, octyl phenol, nonyl phenol, p-tert-octyl phenol, a mixture of phenols, and the like. If desired, the alkylated phenols may also contain one or more non-deleterious substituent groups. The present invention also contemplates use as the phenol component, aromatic derivatives other than phenyl derivatives as, for instance, naphthols and similar derivatives of biphenyl, terphenyl, phenanthrene, anthracene, etc.

As discussed above the sequence of reaction can vary. For instance, when preparing reaction products from styrenemaleic anhydride resins, the resin (i.e. the acid reactant) may first be reacted with the amine component and the resulting product then reacted directly with the phenol component and the aldehyde component. Reaction of the styrene-maleic anhydride copolymer and the amine may be conducted at a reaction temperature of about 125 to 350° C., preferably about 190 to 280° C. Reaction of the resulting product with the phenol and the aldehyde is usually conducted at a temperature of about 125 to 350° C., preferably about 190 to 280° C. Both of the reactions are conveniently carried out at atmospheric pressure but sub- or super-atmospheric pressures can be employed, if desired. The reaction can be carried out in bulk or in the presence of a mutual solvent for the reactant.

Alternatively, the amine, phenol and aldehyde can be reacted first and the condensation product of the three then reacted with the acid copolymer component which may be, for example, a styrene-maleic anhydride resin. Reaction of the amine, phenol and aldehyde components can be carried out conveniently by heating the three-component mixture at a temperature of about 70 to 150° C. until all water of reaction is removed. Reaction of the resulting product with the fourth component, i.e., the acid component, is generally carried out at a temperature of about 200 to 230° C., with the optimum reaction temperature being dependent primarily on the particular copolymeric acid component selected. Again, the reactions proceed readily at atmospheric pressure, although sub- and super-atmospheres of pressure can be utilized.

Numerous other ramifications of these methods can be used for preparing the additives of the invention. For example, in many instances, more than one carboxylic acid or anhydride copolymer reactant may be reacted with one or more of the amines of the invention. In addition, reaction products of the acid component and the amine may be further reacted with phenolic condensation compounds of the amine, phenol and aldehyde reactants in varying stoichiometric ratios.

The following are illustrative of some reactions that may be employed to produce the products of the present invention.

(A) Styrene-maleic anhydride resin+fatty amine+condensation product of alkyl phenol, formaldehyde and polyalkylene polyamine.

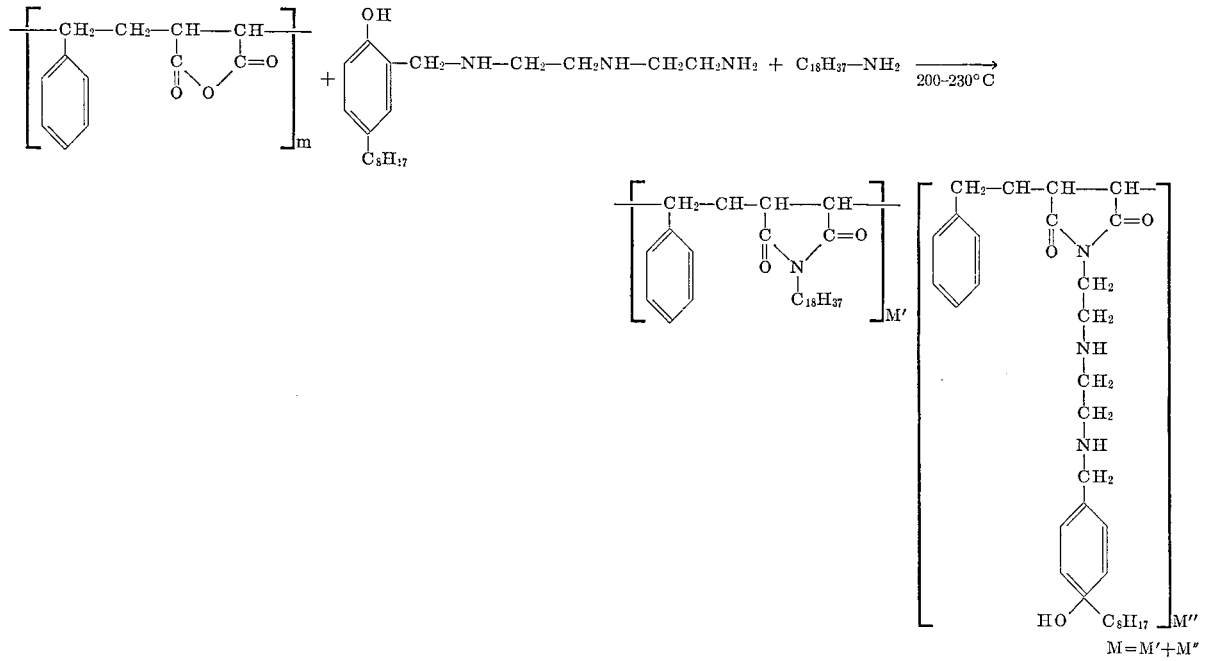

(B) Styrene-maleic anhydride resin+dialkylaminoalkyl amine+condensation product of alkyl phenol, formaldehyde and polyalkylene polyamine.

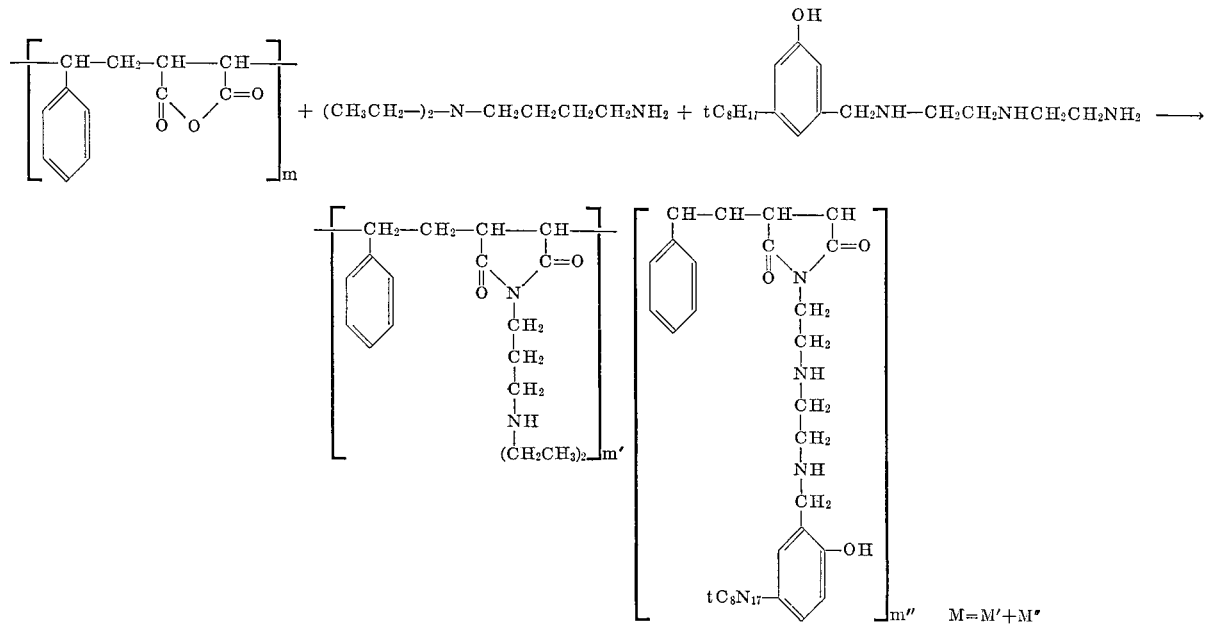

The condensation products of this invention are characterized as either having at least one reactive phenolic hydroxy group which remains unsubstituted or is replaced with an alkaline metal. The oil-soluble alkaline metal salts, particularly the calcium salts, are effective for imparting thermal and oxidative stability to mineral oils. By alkaline metal is meant the alkali metals such as sodium, potassium and lithium and the alkaline earth metals such as calcium, barium and strontium. The alkaline salts can be prepared by neutralization of the condensation product with a basic compound of the alkaline metal as, for instance, the hydroxides, oxides, carbonates and the like or by neutralization with a metal oxide or hydroxide followed by preparation of the alkaline metal salt by metathesis. Preferably when carrying out the neutralization of the condensation product, additional mineral oil of the type employed in preparing a mineral oil concentrate is added to the reaction mixture together with the basic compound and a small amount of water to facilitate the neutralization. Greater than stoichiometric equivalents of the alkaline earth metals can be used, if desired, to give basic salts.

The base oil into which the reaction product of the invention is incorporated can be of lubricating viscosity and can be a mineral oil or a synthetic oil. The mineral lubricating oils can be, for instance, solvent extracted or solvent refined oils obtained in accordance with conventional methods of solvent refining lubricating oils. Frequently, the viscosity of these mineral oils will be about 20 to 250 SUS at 210° F. The mineral base oil may, for example, be derived from paraffinic, naphthenic, asphaltic or mixed base petroleum crudes, and if desired, a blend of solvent-treated Mid-Continent neutrals and Mid-Continent bright stocks may be employed.

Synthetic oils to which the reaction product may be added include ester-based synthetic oil of lubricating viscosity which consists essentially of carbon, hydrogen and oxygen, e.g. di-2-ethylhexyl sebacate. Various of these lubricating materials have been described in the literature and generally their viscosity ranges from the light to heavy oils, e.g. about 50 SUS at 100° F. to 250 SUS at 210° F., and preferably 30 to 150 SUS at 210° F. These esters are of improved thermal stability, low acid number and high flash and fire points. The complex esters, diesters, monoesters and polyesters may be used alone or to achieve the most desirable viscosity characteristics, complex esters, diesters and polyesters may be blended with each other or with naturally-occurring esters like castor oil to produce lubricating compositions of wide viscosity ranges which can be "tailor-made" to meet various specifications. This blending is performed, for example, by stirring together a quantity of diester and complex ester at an elevated temperature, altering the proportions of each component until the desired viscosity is reached.

Various useful ester base oils are disclosed in U.S. Patents Nos. 2,499,983; 2,499,984; 2,575,195; 2,575,196; 2,703,811; 2,705,724; and 2,723,286. Generally, the synthetic base oils consist essentially of carbon, hydrogen and oxygen, i.e. the essential nuclear chemical structure is formed by these elements alone. However, these oils may be substituted with other elements such as halogens, e.g. chlorine and fluorine. Some representative components of ester lubricants are ethyl palmitate, ethyl stearate, di-(2-ethylhexyl) sebacate, ethylene glycol dilaurate, di-(2-ethyl hexyl) phthalate, di-(1,3-methylbutyl) adipate, di-(2-ethylbutyl) adipate, di-(1-ethylpropyl) adipate, di-ethyl oxylate, glycerol tri-n-acetate, di-cyclohexyl adipate, di(undecyl) sebacate, tetraethylene glycol di-(2-ethylene hexoate), di-cellosolve phthalate, butyl phthallyl butyl glycolate, di-n-hexyl fumarate polymer, dibenzyl sebacate and diethylene glycol bis-(2-n-butoxy ethyl carbonate). 2-ethyl-hexyl-adipate-neopentyl glyoly-adipate-2-ethylhexyl is a representative complex ester.

The compositions of this invention incorporate a small, minor amount of the above-described reaction product sufficient to provide the base oil of lubricating viscosity, which is the major portion of the composition, with improved detergent and antioxidant properties. This amount is generally about 0.1 to 10 weight percent or more depending on the particular base oil used and its application. The preferred concentration is about 0.2 to 5%.

Materials normally incorporated in lubricating oils and greases to impart special characteristics can be added to the composition of this invention. These include corrosion inhibitors, extreme pressure agents, anti-wear agents, etc. The amount of additives included in the composition usually ranges from about 0.01 weight percent up to about 20 or more weight percent, and in general they can be employed in any amounts desired as long as the composition is not unduly deleteriously affected.

The following example is included to further illustrate the present invention.

Preparation of reaction product of styrene-maleic anhydride resin, octadecylamine, nonylphenol, formaldehyde and diethylenetriamine (a) Into a 2-liter resin kettle was placed 220 grams of nonylphenol and 465 grams of diethylenetriamine. The mixture was heated to 80° C. and 152 gm. (1.8 moles) of 37% Formalin was added dropwise over a period of about 30 minutes. The mixture was then heated to 125° C. for several hours, e.g. until the water was completely removed from the reaction mixture. The resulting product contained 17.7% nitrogen as determined by Kjeldahl analysis.

(b) Into a resin kettle was placed 202 grams of styrene-maleic anhydride resin (approximately 600–700 molecular weight and a mole ratio of styrene to maleic anhydride of 1:1), 202.5 grams of octadecylamine and 472 grams of a 95 V.I. lubricating oil and a viscosity at 100° F. of 150 SUS. The mixture was heated to 225° C. for several hours. Eighty-five grams of the condensation product from (a) was then added to the mixture dropwise over a period of about 30 minutes. The mixture was heated for 6 hours at 210–230° C., during which time 16.5 ml. of water was collected, indicating that reaction was essentially complete. The product showed Acid No. $pH_{11}$ 0.49, Base No. $pH_4$, 27, percent N, 2.12 (theory 2.18) and initial pH of 9.8. This product showed excellent oil solubility and showed good properties as a detergent and oxidation inhibitor in lubricating oil, for instance, at 1, 2 and 3 weight percent additive levels.

In addition to the alkaline metal salts described above, other useful salts of the reaction product of the invention which can be prepared are the nickel, zinc, aluminum and other metals.

It is claimed:
1. A lubricating oil composition consisting essentially of base oil of lubricating viscosity and a minor amount sufficient to improve the detergent properties of said oil, of an additive comprising the base oil-soluble reaction product of:
 (A) Copolymer of a vinyl addition polymerizable, non-carboxylic compound of 2 to 12 carbon atoms selected from the group consisting of alpha-olefins, alkyl vinyl ethers and styrene, and monoethylenically unsaturated carboxylic acid of 3 to 15 carbon atoms, said copolymer having at least two carboxylic acid groups, and a molecular weight of about 200 to 40,000, reacted at a temperature of about 125 to 350° C. with
 (B) Amine selected from the group consisting of:
  (1) Monoamine having the formula:

wherein R is alkyl of about 5 to 25 carbon atoms, and R' is selected from the group consisting of hydrogen and R, and
  (2) Polyamine having the formula:

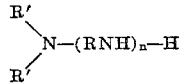

wherein $n$ is an integer of 1 to 10, R is alkylene of 2 to about 25 carbon atoms, R' is selected from the group consisting of hydrogen and hydrocarbon of 1 to about 30 carbon atoms, the resulting product being reacted at a temperature of about 125 to 350° C. with
 (C) Alkylated phenol having at least one alkyl group of about 4 to 20 carbon atoms, and
 (D) Aldehyde of about 1 to 10 carbon atoms; the mole ratio of B to A being about 0.1 to 2 moles of B per reactive carboxylic acid group per mole of A and each of said components C and D being present in an amount of about 0.2 to 2 moles per basic nitrogen per mole of reactant B.

2. A lubricating oil composition consisting essentially of base mineral oil of lubricating viscosity and about 0.1 to 10% by weight of the base oil-soluble reaction product of:
 (A) Copolymer of styrene and maleic anhydride having a mole ratio of styrene to maleic anhydride of about 3 to 1:1 and a molecular weight of about 400 to 3000, reacted at a temperature of about 125 to 350° C. with (B) Amine selected from the group consisting of:
  (1) Monoamine having the formula:

wherein R is alkyl of about 5 to 25 carbon atoms, and R' is selected from the group consisting of hydrogen and R, and
  (2) Polyamine having the formula:

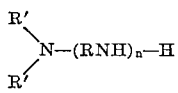

wherein $n$ is an integer of 2 to 10, R is alkylene of 2 to 19 carbon atoms, R' is selected from the group consisting of hydrogen and alkyl of 1 to about 7 carbon atoms, the resulting product being reacted at a temperature of about 125 to 350° C. with
(C) Alkylated phenol having at least one alkyl group of about 4 to 20 carbon atoms, and
(D) Aldehyde of about 1 to 10 carbon atoms; the mole ratio of B to A being about 0.1 to 2 moles of B per reactive carboxylic acid group per mole of A and each of said components C and D being present in an amount of about 0.2 to 2 moles per basic nitrogen per mole of reactant B.

3. A lubricating oil composition consisting essentially of base mineral oil of lubricating viscosity and about 0.1 to 10% by weight of an additive comprising the base oil-soluble reaction product of:
(A) Copolymer of a vinyl addition polymerizable, noncarboxylic compound of 2 to 12 carbon atoms selected from the group consisting of alpha-olefins, alkyl vinyl ethers and styrene and a monoethylenically unsaturated carboxylic acid of 3 to 15 carbon atoms and at least two carboxylic acid groups, said polymer having a molecular weight of about 400 to 3000, reacted at a temperature of about 200 to 230° C. with the reaction product resulting from a reaction at a temperature of about 70 to 150° C. of
(B) Amine selected from the group consisting of:
  (1) Monoamine having the formula:

wherein R is alkyl of about 5 to 25 carbon atoms, and R' is selected from the group consisting of hydrogen and R, and
  (2) Polyamine having the formula:

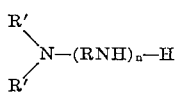

wherein $n$ is an integer of 2 to 10, R is alkylene of 2 to 7 carbon atoms, R' is selected from the group consisting of hydrogen and alkyl of 1 to about 19 carbon atoms
(C) Alkylated phenol having at least one alkyl group of about 4 to 20 carbon atoms, and
(D) Aldehyde of about 1 to 10 carbon atoms; the mole ratio of B to A being about 0.1 to 2 moles of B per reactive carboxylic acid group per mole of A and each of said components C and D being present in an amount of about 0.2 to 2 moles per basic nitrogen per mole of reactant B.

4. A lubricating oil composition consisting essentially of base mineral oil of lubricating viscosity and about 0.1 to 10% by weight of the base-oil soluble reaction product of:
(A) Copolymer of styrene and maleic anhydride having a mole ratio of styrene to maleic anhydride of about 3 to 1:1 said copolymer having a molecular weight of about 400 to 3000 reacted at a temperature of about 200 to 230° C. with the reaction product resulting from a reaction at a temperature of about 70 to 150° C. of
(B) Amine selected from the group consisting of
  (1) Monoamine having the formula:

wherein R is alkyl of about 5 to 25 carbon atoms, and R' is selected from the group consisting of hydrogen and R, and
  (2) Polyamine having the formula:

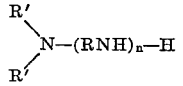

wherein $n$ is an integer of 2 to 10, R is alkylene of 2 to 19 carbon atoms, R' is selected from the group consisting of hydrogen and alkyl of 1 to about 7 carbon atoms,
(C) Alkylated phenol having at least one alkyl group of about 4 to 20 carbon atoms, and
(D) Aldehyde of about 1 to 10 carbon atoms, the mole ratio of B to A being about 0.1 to 2 moles of B per reactive carboxylic acid group per mole of A and each of said components C and D being present in an amount of about 0.2 to 2 moles per basic nitrogen per mole of reactant B.

5. The composition of claim 4 wherein said amine comprises diethylenetriamine and octadecylamine, said phenol is nonyl phenol, and said aldehyde is formaldehyde.

6. The composition of claim 1 wherein the amine component comprises said monoamine and said polyamine, each of said monoamine and said polyamine being present in an amount of at least about 0.05 mole per reactive carboxylic acid group per mole of A.

7. The composition of claim 2 wherein the amine component comprises said monoamine and said polyamine, each of said monoamine and said polyamine being present in an amount of at least about 0.05 mole per reactive carboxylic acid group per mole of A.

8. A lubricating oil composition consisting essentially of base oil of lubricating viscosity and about 0.1 to 10% by weight of an additive comprising the base oil-soluble reaction product of:
(A) Copolymer of a vinyl addition polymerizable, non-carboxylic compound of 2 to 12 carbon atoms selected from the group consisting of alpha-olefins, alkyl vinyl ethers and styrene, and monoethylenically unsaturated carboxylic acid of 3 to 15 carbon atoms, said copolymer having at least two carboxylic acid groups and a molecular weight of about 400 to 3000, reacted at a temperature of about 125 to 350° C. with
(B) Amine selected from the group consisting of:
  (1) Monoamine having the formula:

wherein R is alkyl of about 5 to 25 carbon atoms, and R' is selected from the group consisting of hydrogen and R, and
  (2) Polyamine having the formula:

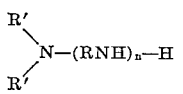

wherein $n$ is an integer of 1 to 10, R is alkylene of 2 to about 25 carbon atoms, R' is selected from the group consisting of hydrogen and hydrocarbon of 1 to about 30 carbon atoms, the resulting product being reacted at a temperature of about 200 to 230° C. with the reaction product resulting from a reaction at a temperature of about 70 to 150° C. of
(C) Amine as defined in B above,
(D) Alkylated phenol having at least one alkyl group of about 4 to 20 carbon atoms, and
(E) Aldehyde of about 1 to 10 carbon atoms; the mole ratio of (B+C) to A being about 0.1 to 2 moles of (B+C) per reactive carboxylic acid group per mole of A and each of said components D and E being present in an amount of about 0.2 to 2 moles per basic nitrogen per mole of (B+C).

9. The composition of claim 8 wherein component B is monoamine and component C is polyamine.

10. A lubricating oil composition consisting essentially of base mineral oil of lubricating viscosity and about 0.1 to 10% by weight of the base oil-soluble reaction product of:
(A) Copolymer of styrene and maleic anhydride having a mole ratio of styrene to maleic anhydride of about 3 to 1:1 and a molecular weight of about 400 to 3000, reacted at a temperature of about 125 to 350° C. with
(B) Amine selected from the group consisting of:
(1) Monoamine having the formula:

wherein R is alkyl of about 5 to 25 carbon atoms, and R' is selected from the group consisting of hydrogen and R, and
(2) Polyamine having the formula:

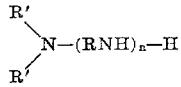

wherein $n$ is an integer of 2 to 10, R is alkylene of 2 to 19 carbon atoms, R' is selected from the group consisting of hydrogen and alkyl of 1 to about 7 carbon atoms, the resulting product being reacted at a temperature of about 200 to 230° C. with the reaction product resulting from a reaction at a temperature of about 70 to 150° C. of
(C) Amine as defined in B above,
(D) Alkylated phenol having at least one alkyl group of about 4 to 20 carbon atoms, and
(E) Aldehyde of about 1 to 10 carbon atoms; the mole ratio of (B+C) to A being about 0.1 to 2 moles of (B+C) per reactive carboxylic acid group per mole of A and each of said components D and E being present in an amount of about 0.2 to 2 moles per basic nitrogen per mole of (B+C).

11. The composition of claim 10 wherein component B is monoamine and component C is polyamine.

12. The composition of claim 11 wherein said reaction product is produced from the reaction of said copolymer with octadecylamine and the condensation product of nonyl phenol, formaldehyde and diethylenetriamine.

References Cited

UNITED STATES PATENTS 3,048,544  8/1962  Stewart et al.
3,291,731  12/1966  Crowley et al.

FOREIGN PATENTS 748,633  5/1956  Great Britain.

OTHER REFERENCES

Noller: Chemistry of Organic Compounds, W. B. Saunders Co., Philidalphia, Pa., 1951, pp. 494–495.

DANIEL E. WYMAN, Primary Examiner

W. J. SHINE, Assistant Examiner